(12) United States Patent
Michiels et al.

(10) Patent No.: US 11,501,108 B2
(45) Date of Patent: Nov. 15, 2022

(54) ADDING A FINGERPRINT TO A MACHINE LEARNING MODEL

(71) Applicant: NXP B.V., Eindhoven (NL)

(72) Inventors: Wilhelmus Petrus Adrianus Johannus Michiels, Reusel (NL); Gerardus Antonius Franciscus Derks, Dongen (NL); Marc Vauclair, Overijse (BE); Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 665 days.

(21) Appl. No.: 16/043,909

(22) Filed: Jul. 24, 2018

(65) Prior Publication Data

US 2020/0034663 A1 Jan. 30, 2020

(51) Int. Cl.
*G06K 9/62* (2022.01)
*G06F 11/10* (2006.01)
*G06N 20/00* (2019.01)

(52) U.S. Cl.
CPC ............ *G06K 9/6257* (2013.01); *G06F 11/10* (2013.01); *G06N 20/00* (2019.01)

(58) Field of Classification Search
CPC ...... G06K 9/6257; G06K 9/627; G06F 11/10; G06F 15/18; G06N 20/00; H04N 2201/3233
See application file for complete search history.

(56) References Cited

U.S. PATENT DOCUMENTS

| | | | |
|---|---|---|---|
| 9,911,290 B1* | 3/2018 | Zalewski | G06Q 20/327 |
| 2005/0025337 A1* | 2/2005 | Lu | G06T 1/0028 382/100 |
| 2005/0055554 A1* | 3/2005 | Sion | H04N 1/32267 713/176 |
| 2015/0055855 A1* | 2/2015 | Rodriguez | G06K 9/6259 382/159 |

OTHER PUBLICATIONS

Zhang ("Protecting Intellectual Property of Deep Neural Networks with Watermarking"; Jun. 4-8, 2018, Incheon, Republic of Korea. ACM, New York, NY, USA; pp. 1-13; URL: https://doi.org/10.1145/3196494.3196550) (Year: 2018).*

(Continued)

*Primary Examiner* — Peet Dhillon

(57) ABSTRACT

Various embodiments relate to a method of producing a machine learning model with a fingerprint that maps an input value to an output label, including: selecting a set of extra input values, wherein the set of extra input values does not intersect with a set of training labeled input values for the machine learning model; selecting a first set of artificially encoded output label values corresponding to each of the extra input values in the set of extra input values, wherein the first set of artificially encoded output label values are selected to indicate the fingerprint of a first machine learning model; and training the machine learning model using a combination of the extra input values with associated first set of artificially encoded output values and the set of training labeled input values to produce the first learning model with the fingerprint.

10 Claims, 1 Drawing Sheet

(56) References Cited

OTHER PUBLICATIONS

Sharma ("Analysis of Image Watermarking using Least Significant Bit Algorithm"; International Journal of Information Sciences and Techniques (IJIST) vol. 2, No. 4, Jul. 2012; pp. 7; URL: http://airccse.org/journal/IS/papers/2412ijist09.pdf) (Year: 2012).*
CIFAR-10 and CIFAR-100 Datasets, Jul. 3, 2018, https://www.cs.toronto.edu/~kriz/cifar.html, 3 pages.
He, Kaiming et al., Deep Residual Learning for Image Recognition, Microsoft Research 12 pages, Dec. 10, 2015.
C. Song, et al. "Machine Learning Models that Remember Too Much".
Tramer, Florian et al., Stealing Machine Learning Models via Prediction APIs, Proc. of the 25th USENIX Security Symp., Aug. 10-12, 2016, Austin, TX, pp. 601-618.
Zhang et al., Protecting Intellectual Property of Deep Neural Networks with Watermarking, ASIACCS'18, Jun. 4-8, 2018, Incheon, Republic of Korea, pp. 159-171.
Zhang, Chiyuan et al., Understanding Deep Learning Requires Re-thinking Generalization (published as a conference paper at ICLR 2017), 15 page.

\* cited by examiner

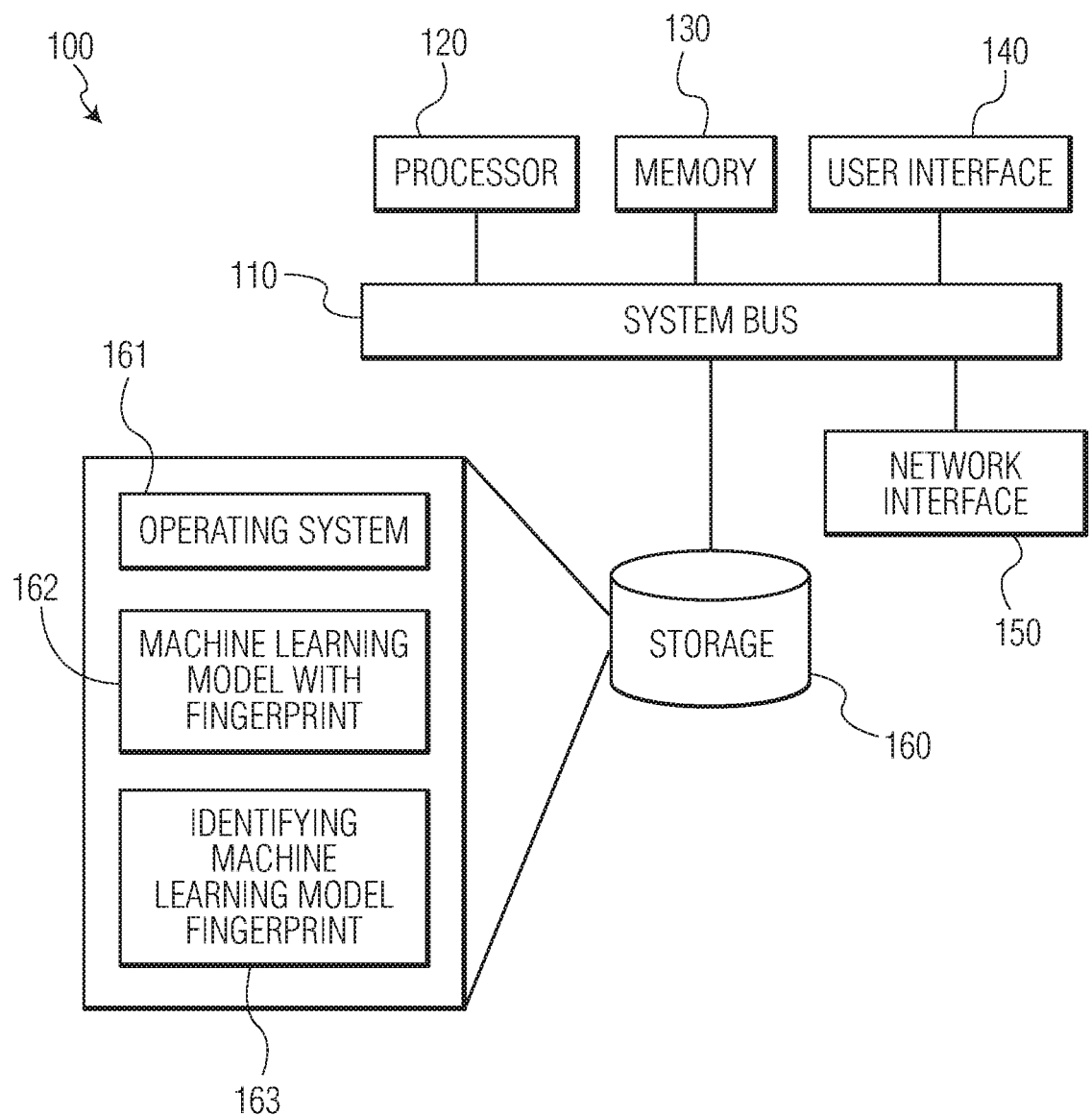

ADDING A FINGERPRINT TO A MACHINE LEARNING MODEL

TECHNICAL FIELD

Various exemplary embodiments disclosed herein relate generally to adding a fingerprint to a machine learning model.

BACKGROUND

The quality of a machine learning model heavily depends on the quality of its training data. Such training data is typically hard to get, which makes the training data, as well as the model obtained from it, a valuable asset. However, a recent result shows that a machine learning model can be copied quite easily. Only a black-box access to its input/output behavior already suffices to make a copy. Once having the machine learning model, the adversary can illegitimately monetize it.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of producing a machine learning model with a fingerprint that maps an input value to an output label, including: selecting a set of extra input values, wherein the set of extra input values does not intersect with a set of training labeled input values for the machine learning model; selecting a first set of artificially encoded output label values corresponding to each of the extra input values in the set of extra input values, wherein the first set of artificially encoded output label values are selected to indicate the fingerprint of a first machine learning model; and training the machine learning model using a combination of the extra input values with associated first set of artificially encoded output values and the set of training labeled input values to produce the first learning model with the fingerprint.

Various embodiments are described, further including: selecting a second set of artificially encoded output label values corresponding to each of the extra input values in the set of extra input values, wherein the second set of artificially encoded output label values are selected to indicate the fingerprint of a second machine learning model, wherein the second set of artificially encoded output label values is disjoint from the first set of artificially encoded output label values; and training the machine learning model using a combination of the extra input values with associated second set of artificially encoded output values and the set of training labeled input values to produce the second learning model with the fingerprint.

Various embodiments are described, wherein the fingerprint of the first machine learning model is based upon specific bits from each the artificially encoded output label values in the first set of artificially encoded output label values.

Various embodiments are described, wherein the specific bits are one of a specific number of least significant bits, a specific number of most significant bits, or a specific number of contiguous bits.

Various embodiments are described, wherein the fingerprint includes error correction bits.

Various embodiments are described, wherein each member of a set of extra input values to the machine learning model corresponds to a specific fingerprint and the first machine learning model produces a predetermined output only when the member of the set of extra inputs corresponds to the fingerprint associated with the first machine learning model.

Various embodiments are described, further including: inputting each the extra input values in the set of extra input values into the first model to obtain a first set of outputs; determining that first set of outputs is correct; and retraining the machine learning model using the combination of the extra input values with associated second set of artificially encoded output values and the set of training labeled input values to produce a first retrained second learning model with the fingerprint, when the first set of outputs is not correct.

Further various embodiments relate to a method of determining the fingerprint of a machine learning model that maps an input value to an output label, including: applying a set of extra input values to the machine learning model, wherein the set of extra input values does not intersect with a set of training labeled input values for the machine learning model to produce a first set outputs; and determining the fingerprint of the machine learning model based upon the first set of outputs.

Various embodiments are described, wherein the fingerprint of the machine learning model is based upon specific bits from each the artificially encoded output label values in the first set of artificially encoded output label values.

Various embodiments are described, wherein the fingerprint of the machine learning model is a concatenation of the specific bits from each the artificially encoded output label values in the first set of artificially encoded output label values.

Various embodiments are described, wherein the specific bits are one of a specific number of least significant bits, a specific number of most significant bits, or a specific number of contiguous bits.

Various embodiments are described, wherein each member of a set of extra input values to the machine learning model corresponds to a specific fingerprint, the machine learning model produces a predetermined output only when the member of the set of extra inputs corresponds to the fingerprint associated with the machine learning model, and determining the fingerprint of the machine learning model based upon the first set of outputs further comprises: determining which of the first set of outputs equals the predetermined output.

Further various embodiments relate to a non-transitory machine-readable storage medium encoded with instructions for producing a machine learning model with a fingerprint that maps an input value to an output label, including: instructions for selecting a set of extra input values, wherein the set of extra input values does not intersect with a set of training labeled input values for the machine learning model; instructions for selecting a first set of artificially encoded output label values corresponding to each of the extra input values in the set of extra input values, wherein the first set of artificially encoded output label values are selected to indicate the fingerprint of a first machine learning model; and instructions for training the machine learning model using a combination of the extra input values with associated first set of artificially encoded output values and the set of training labeled input values to produce the first learning model with the fingerprint.

Various embodiments are described, wherein further including: instructions for selecting a second set of artificially encoded output label values corresponding to each of the extra input values in the set of extra input values, wherein the second set of artificially encoded output label values are selected to indicate the fingerprint of a second machine learning model, wherein the second set of artificially encoded output label values is disjoint from the first set of artificially encoded output label values; and instructions for training the machine learning model using a combination of the extra input values with associated second set of artificially encoded output values and the set of training labeled input values to produce the second learning model with the fingerprint.

Various embodiments are described, wherein the fingerprint of the first machine learning model is based upon specific bits from each the artificially encoded output label values in the first set of artificially encoded output label values.

Various embodiments are described, wherein the specific bits are one of a specific number of least significant bits, a specific number of most significant bits, or a specific number of contiguous bits.

Various embodiments are described, wherein the fingerprint includes error correction bits.

Various embodiments are described, wherein each member of a set of extra input values to the machine learning model corresponds to a specific fingerprint and the first machine learning model produces a predetermined output only when the member of the set of extra inputs corresponds to the fingerprint associated with the first machine learning model.

Various embodiments are described, further including: instructions for inputting each the extra input values in the set of extra input values into the first model to obtain a first set of outputs;

instructions for determining that first set of outputs is correct; and instructions for retraining the machine learning model using the combination of the extra input values with associated second set of artificially encoded output values and the set of training labeled input values to produce a first retrained second learning model with the fingerprint, when the first set of outputs is not correct.

Further various embodiments relate to a non-transitory machine-readable storage medium encoded with instructions for determining the fingerprint of a machine learning model that maps an input value to an output label, including: instructions for applying a set of extra input values to the machine learning model, wherein the set of extra input values does not intersect with a set of training labeled input values for the machine learning model to produce a first set outputs; and instructions for determining the fingerprint of the machine learning model based upon the first set of outputs.

Various embodiments are described, wherein the fingerprint of the machine learning model is based upon specific bits from each the artificially encoded output label values in the first set of artificially encoded output label values.

Various embodiments are described, wherein the fingerprint of the machine learning model is a concatenation of the specific bits from each the artificially encoded output label values in the first set of artificially encoded output label values.

Various embodiments are described, wherein the specific bits are one of a specific number of least significant bits, a specific number of most significant bits, or a specific number of contiguous bits.

Various embodiments are described, wherein each member of a set of extra input values to the machine learning model corresponds to a specific fingerprint, the machine learning model produces a predetermined output only when the member of the set of extra inputs corresponds to the fingerprint associated with the machine learning model, and instructions for determining the fingerprint of the machine learning model based upon the first set of outputs further comprises: instructions for determining which of the first set of outputs equals the predetermined output.

BRIEF DESCRIPTION OF THE DRAWINGS

In order to better understand various exemplary embodiments, reference is made to the accompanying drawings, wherein:

FIG. 1 illustrates an exemplary hardware diagram for implementing embodiments described herein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Nowadays, more and more functionality is implemented via machine learning (ML) models. Some of ML models beneficial properties are: flexibility; an ability to handle large amounts of data; easily customizable; and an ability to solve (e.g., visual) recognition problems that are difficult to solve by standard algorithms.

The embodiments describe herein are most effective for ML models that are obtained via supervised learning, but may also be applicable when the ML models are obtained via reinforcement learning. In case of supervised learning, the ML model is trained using data of which the desired output is given. Such training data is called labelled data. The ML model used during deployment includes a model of a certain model class and learned parameters for the model based upon the training process. The model class refers to the approach taken by the ML model. Among most common examples one may find Neural Networks (NN) and Support Vector Machines (SVM). In case of a NN, the architectural structure of the network, e.g., the size and number of hidden layers, is described by its model class. The model parameters are what is learned from the training data. The model may be learned before it is used (batch learning) or it can be trained during its usage (incremental learning). A hybrid of the two is also possible. For example, the ML model may be initialized with an offline trained model and customized during its usage.

The effectiveness of a ML model heavily depends on the quality (as well as quantity) of the training data. The expertise that goes into the compilation of a representative training set and the cost involved in getting and labelling this data (which may include manual labelling of the data) makes the training data, as well as the model obtained from it, a very valuable asset. However, recently it has been demonstrated that a machine learning model may quite easily be copied. See for example, F. Tramer, F. Zhang, A. Juels, M. Reiter, and T. Ristenpart: Stealing Machine Learning Models via Prediction APIs. Proceedings of $25^{th}$ USENIX Security Symposium, 2016. Only a black-box access to its input/output behavior suffices to copy the model. Once the adversary has copied the machine learning model, the adversary may illegitimately monetize it. For instance, by implementing it on its own competing device or by offering it as a service via the cloud.

As a line of defense against such cloning attacks, the embodiments described herein describe a method for fingerprinting a machine learning model, such that the adversary may be identified based on the functional behavior of the machine learning model. This is done in a way that does not noticeably affect the intended functionality of the implementation. The embodiments use the fact that machine learning models, such as deep neural networks, have so much learning capacity that, in addition to their primary task, the machine learning models have ample capacity left to learn additional data. This was described in C. Zhang, S. Bengio, M. Hardt, B. Recht, O. Vinyals: Understanding deep learning requires rethinking generalization, Proceedings of ICLR, 2017. It has been illustrated that this property may be exploited to mount an attack by which an adversary with access to the training algorithm may modify the ML model so that it leaks the possibly privacy-sensitive training data. See C. Song, T. Ristenpart, V. Shmatikov: Machine Learning Models that Remember Too Much, Proceedings of the 2017 ACM SIGSAC Conference on Computer and Communications Security, pp. 587-601, 2017. The embodiments described herein utilize the approach of this attack to the advantage of the ML model provider to fingerprint the ML model.

The embodiments described herein may be used to trace back a copy of a ML implementation to the original owner (i.e., using the leakage information) just by inspecting its functional behavior. This implies that the implementation may be considered as a black box. Hence, the adversary cannot hide this fingerprint by offering the ML model as a service in the cloud or by obfuscating the ML model. Once the fingerprint is recognized using the model, adequate action may be taken.

An embodiment of a ML model includes two aspects: the inclusion of a fingerprint in a ML model; and the identification of a fingerprint in a ML model based on its input/output behavior of the ML model while using the ML model. Regarding the first aspect, the embodiment executes the following steps, where n denotes the number of fingerprinted versions of the machine learning model that user wants to obtain.

For a desired application, X is defined as a set of valid input data, and Y is defined as the set of possible output values. Furthermore, the function label: $X \rightarrow Y$ denotes mapping input data to the correct corresponding output value.

Hence, an accurate machine learning model could be obtained by training it using data from $\Omega = \{(v, label(v)) | v \in X\}$.

Next, a set A is defined as a set of artificially constructed input data such that $X \cap A = \emptyset$. Then, for any $i=0, 1, \ldots, n-1$ a function $label_i: A \rightarrow Y$ is defined that maps the artificial data set A to an output value such that $\Omega_i = \{(v, label_i(v)) | v \in A\}$.

For $i=0, 1, \ldots, n-1$ machine learning model $M_i$ is obtained by training the model via a training sets $T_i \subseteq \Omega \cup \Omega_i$. Let $T_i(A)$ be the part of a training set of which the input comes from set A, i.e., $T_i(A) \subseteq T_i \cap \Omega_i$. Next, the functions $label_i$ and the sets $T_i$ are chosen such that the following important property is satisfied: for all $i, j=0, 1, \ldots, n-1$ the training sets $T_i, T_j$ satisfy the property that $T_i(A) \neq T_j(A)$, which means that the training data taken from A is different for each version.

Let $T_{i,in} = \{v | (v, label_i(v)) \in T_i(A)\}$ be the input values of the training set $T_i$ that belong to A. Then, the fingerprint of $M_i$ is defined as its behavior on $T_{i,in}$, i.e., the outputs of the model when $T_i(A)$ is input.

Next, the identification of a fingerprint for an instance of a machine learning model may be accomplished by executing the following steps.

Let M be a machine learning model for which we want to derive its fingerprint.

For each i, check whether for all $v \in T_{i,in}$ when v is input to M produces $label_i(v)$ as the output. All i that satisfy this property are added to the set C of candidate fingerprints for being included in M. The fingerprint of M is included in the derived set C.

It is noted that by choosing the fingerprints wisely, the following improvements may be achieved. All fingerprints do not need to be tried in the identification phase. For example, by including an element $v \in A$ in all training sets and by mapping v in half of the fingerprints to one particular value and the other half to another value, then we can use the outcome of M on v to limit by half the number of possibilities.

The derived set C may only contain one candidate fingerprint by including the entire set A in all training sets $T_i$ (and by training the machine learning model well), the outcomes of n machine learning models differ for at least one element from A.

An example of how such an embodiment could be implemented will now be described that builds on the experiments discussed by Song et al. in the paper identified above. In his work, Song considers the training of several machine learning approaches for several datasets. In this embodiment, the experiments Song performed for a residual neural network (RES), which includes of 34 layers using the CIFAR-10 dataset (see A. Krizhevsky, V. Nair, and G. Hinton, The CIFAR-10 dataset, available online at: https://www.cs.toronto.edu/~kriz/cifar.html), which contains 60,000 images classified into 10 classes.

To start with, Song trains RES using the CIFAR-10 dataset using a training set of 50,000 labelled images. This set is a subset of the 60,000 images of the total data set. The RES model has 460,000 weights that need to be trained. After training, Song achieved a test accuracy of 92.89%.

Next, song retrains the model, but adds to the 50,000 images to train with 49,000 artificially constructed images. These images are constructed by setting all pixels except for 1 to the value 0. The non-zero pixel is given a pseudo-random value between 0 and 255. During the generation of the artificial images, they iterate over all possible locations of the pixel.

In CIFAR-10, the model classifies images into 10 classes. Hence, the class with which an artificial image is labeled may encode $\log_2(10)$ bits of information. Song uses this capacity only partly: they encode only 2 bits of the training data in each artificial image. This can be done by considering the binary representation of the class numbers and defining the label label(x) of an artificial image x as any of the 10 classes that has as its 2 least significant bits the 2 bits that are to be encoded in X.

The results of Song et al. show that by doing this, the accuracy of detecting images hardly deteriorates (less than 1%). However, if an adversary feeds the trained model with an artificial input that it added to the training set, the returned class provides 2 bits of the original training data. Hence, by inferring the model for all 49,000 artificial inputs, 2×49,000=98,000 bits of the training data may be obtained.

Now, an embodiment will be described that extends this result to obtain $2^{32}$ different versions of the machine learning models, denoted by $M_0, M_1, \ldots, M_{2^{32}-1}$. These versions all have a similar accuracy on their primary task, which can be expressed as the accuracy they have on a test set taken from the CIFAR-10 data. However, they all include their own unique fingerprint by which they can be identified. The embodiment may include the following steps.

The set X may be defined as the set of images from the CIFAR-10 data and Y is the set of 10 classes in which the images may be classified. The classes are numbered from 0 to 9. Like Song, a basic training set II is used that is a subset of the labelled data in the CIFAR-10 data of size 50,000.

A set $A=\{a_0, a_1, \ldots, a_{15}\}$ of only 16 artificially constructed inputs is next derived. For this, the following approach may be used, which is similar to the one proposed by Song: input $a_j$ is obtained by selecting a unique location $L_j$ (hence, $L_k \neq L_l$ for all k, l) and by setting all pixel values to 0, except for location $L_j$ where the pixel value is set to a pseudo-random value.

Let $bit_i(j)$ be bit j of the binary representation of i (in a little-endian storage order) and let $rand\_class(b_1,b_0) \in Y$ be a random class where the two least significant bits are given by $b_0$ and $b_1$, respectively. Then, define a labelling function $label_i$ with i=0, 1, . . . , $2^{32}-1$ such that for any j=0, 1, . . . , 15: $label_i(a_j)=rand\_class(bit_i(2*j), bit_i(2*j+1))$. Hence, if the two least significant bits of the class numbers assigned to $a_0, a_1, \ldots$ are sequenced, the binary representation of i results, which is the number of the fingerprint. Using these definitions, $\Omega_i=\{(a_j, label_i(a_j))|j=0, 1, \ldots, 15\}$ may be defined. This results in each $a_i$ encoding two bits of the final fingerprint i.

For i=0, 1, n−1, the machine learning model $M_i$ is obtained by training the model via a training sets $T_i=\Omega \cup \Omega_i$. This means that $T_i(A)=\Omega_i$. Because no two fingerprints have the same binary representation, the following required property is satisfied: for all i,j=0, 1, . . . , $2^{32}-1$ the training sets $T_i, T_j$ satisfy $T_i(A) \neq T_j(A)$. The fingerprint of $M_i$ is defined as its behavior on input $T_{i,in}=\{a_j|(a_j,label_i(a_j))\in T_i(A)\}$.

An embodiment of a method of identifying a fingerprint will be given that includes the following steps. Let M be a ML model for which its fingerprint is to be determined. For each $a_i \in A$, $a_i$ is input to the ML model M, and $b_{2*i}$ and $b_{2*i+1}$ are defined as the two least significant bits of the returned class. The fingerprint of M is now given by $b_0; \ldots; b_{31}$.

Note that the ML model fingerprint identification only requires 16 invocations of the machine learning model and that this is sufficient to distinguish as many as $2^{32}$ different fingerprints.

To determine that this embodiment does not deteriorate the performance of the machine learning model in its primary task of classifying the CIFAR-10 data, note that for any single fingerprint, the artificially constructed labelled data included in a training set is similar to the artificially constructed labelled data that is included in a training set by Song. Further, a far smaller amount artificial data is used, i.e., 16 versus 49,000 additional artificial inputs. Accordingly, the effect on the accuracy of the underlying model will be even less than that of Song, which was less than 1%.

It is possible that the derived machine learning model misclassifies one of the inputs from A. If this happens, the identification procedure may return an incorrect fingerprint. To exclude this possibility, one of the following improvements may be implemented.

After training the ML model, the ML model is tested using the inputs from A. If one of the inputs from A is misclassified, the model may be retrained until the classification works properly.

Alternatively, the fingerprints may be encoded using error correcting codes, which results in a fingerprint determination that is robust against misclassification of the inputs from A. Note, however, because two bits are encoded per element from A, a k-bit error correcting code only can repair for k/2 misclassifications.

While a specific encoding was described above, other encodings of the fingerprint may be accomplished using the techniques described above. If for example, only a small number of different fingerprints are needed, then each extra artificial input and its selected output may be used identify a specific fingerprint value. That is for an extra artificial input $a_j$ the model is trained to provide a specific output $label_j(a_j)$ for a fingerprint j and some other output value when a fingerprint different from j is trained. As a result, each $a_j$ may be input into the model, and the one that produced a correct output corresponds to the fingerprint value j.

The embodiments describe herein provide a technological solution to the problem of identifying via a fingerprint the operation of a ML model. This means that even if an attacker uses various methods to copy the ML model of another, the copied ML model may be interrogated using predefined inputs to determine a fingerprint of the copied ML model. This fingerprint would then indicate the original source of the ML model. As described above, a large number of different fingerprints (e.g., 2") may be encoded using a small number of extra artificially encoded inputs (e.g., 16). These extra artificially encoded inputs have very minimal impact on the performance of the underlying ML model.

FIG. 1 illustrates an exemplary hardware diagram 100 for implementing the embodiments described above. As shown, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in memory 130 or storage 160 or otherwise processing data. As such, the processor may include a microprocessor, field programmable gate array (FPGA), application-specific integrated circuit (ASIC), or other similar devices.

The memory 130 may include various memories such as, for example L1, L2, or L3 cache or system memory. As such, the memory 130 may include static random-access memory (SRAM), dynamic RAM (DRAM), flash memory, read only memory (ROM), or other similar memory devices.

The user interface 140 may include one or more devices for enabling communication with a user such as an administrator. For example, the user interface 140 may include a display, a mouse, and a keyboard for receiving user commands. In some embodiments, the user interface 140 may include a command line interface or graphical user interface that may be presented to a remote terminal via the network interface 150. In some embodiments, no user interface may be present.

The network interface 150 may include one or more devices for enabling communication with other hardware devices. For example, the network interface 150 may include a network interface card (NIC) configured to communicate according to the Ethernet protocol. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 161 for controlling various basic operations of the hardware 100. Further, software for creating and implementing the ML model with a fingerprint 162, may be stored in the memory. Further, software for determining the fingerprint of the ML model 163 may also be stored in the memory. This software may implement the various embodiments described above.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the host device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. Further, where the device 100 is implemented in a cloud computing system, the various hardware components may belong to separate physical systems. For example, the processor 120 may include a first processor in a first server and a second processor in a second server.

The embodiments described in FIG. 1 may also be implemented completely in hardware, completely in software such as described in FIG. 1, or a combination of both hardware and software.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method of producing a first machine learning model and a second machine learning model that maps an input value to an output label, comprising:

selecting a set of common training labeled input values, a first set of extra input values and a second set of extra input values from a set of valid input values for the first machine learning model and the second machine learning model, wherein the set of common training labeled input values, first set of extra input values, and second set of extra input values do not intersect with one another such each valid input value is in at most one of the set of common training labeled input values, first set of extra input values, and second set of extra input values;

selecting a first set of artificially encoded output label values corresponding to each of the extra input values in the first set of extra input values, wherein the first set of artificially encoded output label values are selected to indicate a first fingerprint of the first machine learning model;

training the first machine learning model using a combination of the first extra input values with associated first set of artificially encoded output values and the set of common labeled training input values to produce the first learning model with the first fingerprint;

selecting a second set of artificially encoded output label values corresponding to each of the extra input values in the second set of extra input values, wherein the second set of artificially encoded output label values are selected to indicate a second fingerprint of a second machine learning model; and training the second machine learning model using a combination of the second extra input values with associated second set of artificially encoded output values and the set of common labeled training input values to produce the second learning model with the second fingerprint, wherein the first machine learning model and the second machine learning produce the same output for the set of common labeled training inputs and the first machine learning model and the second machine learning model have different fingerprints.

2. The method of claim 1, wherein the fingerprint of the first machine learning model is based upon specific bits from each of the artificially encoded output label values in the first set of artificially encoded output label values.

3. The method of claim 2, wherein the specific bits are one of a specific number of least significant bits, a specific number of most significant bits, or a specific number of contiguous bits.

4. The method of claim 2, wherein the fingerprint includes error correction bits.

5. The method of claim 1, wherein each member of the first set of extra input values to the first machine learning model corresponds to the first fingerprint and the first machine learning model produces a predetermined output indicating the first fingerprint only when members of the first set of extra inputs are input into the first machine learning model.

6. A non-transitory machine-readable storage medium encoded with instructions for producing a first machine learning model and a second machine learning model that maps an input value to an output label:
- instructions for selecting a set of common training labeled input values, a first set of extra input values, and a second set of extra input values from a set of valid input values for the first machine learning model and the second machine learning model, wherein the set of common training labeled input values, first set of extra input values, and second set of extra input values do not intersect with one another such each valid input value is in at most one of the set of common training labeled input values, first set of extra input values, and second set of extra input values;
- instructions for selecting a first set of artificially encoded output label values corresponding to each of the extra input values in the first set of extra input values, wherein the first set of artificially encoded output label values are selected to indicate a first fingerprint of the first machine learning model;
- instructions for training the first machine learning model using a combination of the first extra input values with associated first set of artificially encoded output values and the set of common labeled training input values to produce the first learning model with the first fingerprint;
- instructions for selecting a second set of artificially encoded output label values corresponding to each of the extra input values in the second set of extra input values, wherein the second set of artificially encoded output label values are selected to indicate a first second fingerprint of a second machine learning model; and
- instructions for training the second machine learning model using a combination of the second extra input values with associated second set of artificially encoded output values and the set of common labeled training input values to produce the second learning model with the second fingerprint,
- wherein the first machine learning model and the second machine learning produce the same output for the set of common labeled training inputs and the first machine learning model and the second machine learning model have different fingerprints.

7. The non-transitory machine-readable storage medium of claim 6, wherein the fingerprint of the first machine learning model is based upon specific bits from each of the artificially encoded output label values in the first set of artificially encoded output label values.

8. The non-transitory machine-readable storage medium of claim 7, wherein the specific bits are one of a specific number of least significant bits, a specific number of most significant bits, or a specific number of contiguous bits.

9. The non-transitory machine-readable storage medium of claim 7, wherein the fingerprint includes error correction bits.

10. The non-transitory machine-readable storage medium of claim 6, wherein each member of the first set of extra input values to the first machine learning model corresponds to the first fingerprint and the first machine learning model produces a predetermined output indicating the first fingerprint only when members of the first set of extra inputs are input into the first machine learning model.

* * * * *